(12) United States Patent
Diwakar

(10) Patent No.: US 9,088,575 B2
(45) Date of Patent: **\*Jul. 21, 2015**

(54) SYSTEM AND METHOD FOR HAND-OFFS IN CLOUD ENVIRONMENTS

(71) Applicant: CA, Inc., Islandia, NY (US)

(72) Inventor: Kiran Prakash Diwakar, Maharashtra (IN)

(73) Assignee: CA, INC., New York, NY (US)

(*) Notice: Subject to any disclaimer, the term of this patent is extended or adjusted under 35 U.S.C. 154(b) by 122 days.

This patent is subject to a terminal disclaimer.

(21) Appl. No.: 14/179,249

(22) Filed: Feb. 12, 2014

(65) Prior Publication Data

US 2014/0237016 A1 Aug. 21, 2014

Related U.S. Application Data

(63) Continuation of application No. 13/299,938, filed on Nov. 18, 2011, now Pat. No. 8,688,768.

(51) Int. Cl.
 *G06F 15/16* (2006.01)
 *H04L 29/08* (2006.01)
 *G06F 9/50* (2006.01)

(52) U.S. Cl.
 CPC .............. *H04L 67/10* (2013.01); *G06F 9/5072* (2013.01)

(58) Field of Classification Search
 USPC ................... 709/201, 202, 204, 217, 223
 See application file for complete search history.

(56) References Cited

U.S. PATENT DOCUMENTS

| | | | |
|---|---|---|---|
| 2008/0301668 A1* | 12/2008 | Zachmann | 717/173 |
| 2009/0300635 A1 | 12/2009 | Ferris | |
| 2010/0058349 A1 | 3/2010 | Diwakar | |
| 2010/0087963 A1 | 4/2010 | Boston | |
| 2010/0125473 A1 | 5/2010 | Tung | |
| 2010/0125664 A1* | 5/2010 | Hadar et al. | 709/224 |
| 2010/0202314 A1* | 8/2010 | Hauck et al. | 370/252 |
| 2010/0235887 A1 | 9/2010 | Burch | |
| 2010/0268632 A1 | 10/2010 | Rosenthal | |
| 2010/0271956 A1 | 10/2010 | Diwakar | |
| 2010/0274621 A1 | 10/2010 | Diwakar | |
| 2010/0287263 A1 | 11/2010 | Liu et al. | |
| 2010/0293110 A1 | 11/2010 | Rosenthal | |
| 2010/0318642 A1 | 12/2010 | Dozier | |
| 2010/0319004 A1 | 12/2010 | Hudson | |
| 2010/0332401 A1 | 12/2010 | Prahlad | |
| 2010/0332629 A1 | 12/2010 | Cotugno | |

(Continued)

*Primary Examiner* — Liangche A Wang
(74) *Attorney, Agent, or Firm* — Pillsbury Winthrop Shaw Pittman LLP

(57) ABSTRACT

A system, method, and computer-readable storage medium for handling hand-offs in a cloud computing environment is provided. The method includes identifying, at a cloud governance module of a server device, a plurality of applications executing on a plurality of servers belonging to a plurality of cloud computing service providers. The method includes determining, based upon information in a policy module, to hand-off an execution of at least one identified application executing on a first cloud computing service provider platform to a second cloud computing service provider, determining whether the second cloud computing service provider satisfies one or more governance policies associated with the at least one identified application, and handing-off the execution of the at least one identified application to a second cloud computing provider platform based upon the second cloud computing provider being compliant with the one or more governance policies associated with the at least one identified application.

20 Claims, 3 Drawing Sheets

(56) References Cited

U.S. PATENT DOCUMENTS

| | | |
|---|---|---|
| 2010/0332818 A1 | 12/2010 | Prahlad |
| 2010/0333116 A1* | 12/2010 | Prahlad et al. ............... 719/328 |
| 2011/0016214 A1 | 1/2011 | Jackson |
| 2011/0022642 A1 | 1/2011 | Demilo |
| 2011/0055559 A1 | 3/2011 | Li |
| 2011/0072486 A1 | 3/2011 | Hadar |
| 2011/0072487 A1 | 3/2011 | Hadar |
| 2011/0106927 A1 | 5/2011 | Carter |
| 2011/0107398 A1 | 5/2011 | Earl |
| 2011/0118880 A1 | 5/2011 | Diwakar |
| 2011/0131275 A1 | 6/2011 | Maida-Smith |
| 2012/0110186 A1* | 5/2012 | Kapur et al. .................. 709/226 |
| 2012/0131193 A1* | 5/2012 | Ferris et al. ................... 709/226 |
| 2012/0185413 A1* | 7/2012 | Felter ............................ 705/400 |
| 2013/0085989 A1* | 4/2013 | Nayyar et al. ................ 707/610 |
| 2013/0132457 A1 | 5/2013 | Diwakar |
| 2013/0132946 A1* | 5/2013 | Ma .................................... 718/1 |

\* cited by examiner

SYSTEM AND METHOD FOR HAND-OFFS IN CLOUD ENVIRONMENTS

CROSS-REFERENCE TO RELATED APPLICATIONS

This application is a continuation of U.S. patent application Ser. No. 13/299,938, entitled "System and Method for Hand-Offs in Cloud Environments," filed Nov. 18, 2011, the contents of which are hereby incorporated herein by reference in their entirety.

FIELD

The invention relates generally to the field of application/service hosting cloud computing systems and more particularly to handling of hand-offs of application/service hosting between cloud environments.

BACKGROUND

Cloud computing environments have turned around the manner in which business organizations examine the requirements and capacity to implement their data processing needs. A cloud computing environment includes capabilities where the cloud provider hosts the hardware and related items and provides systems and computational power as a service to a customer (e.g., a business organization). When implementing data processing needs via a cloud vendor, a customer does not need to bear the cost of space, energy, and maintenance in order to acquire the required computational resources at a reasonable cost in a fast and efficient manner.

In a typical scenario, it is substantially cumbersome for organizations to take care of their governance needs when operating in a cloud environment. In cloud environments, there is a need to move items, e.g., infrastructure, application(s), or storage, out of the premises to a different physical and/or logical location. In such a scenario, conventionally, organizations do not have a mechanism to ensure compliance to policies and security issues. This is true even though the customers are dealing with just one cloud vendor or cloud computing service provider that the organization utilizes for various items.

The current trends and analysis by different market study groups indicate that the scenario and the landscape in the cloud computing environment will continue to change, and there will be more vendors in the market in the near future. Over a period of time, customers may be dealing (directly or indirectly) with multiple cloud vendors, and therefore there is a need for an automated tool that will help customers with their governance policies, assets, and resource profiles. These and other drawbacks exist in conventional systems.

SUMMARY

In some implementations, these and other drawbacks of existing systems are addressed, where provided is a system, method, and computer-readable storage medium having one or more computer-readable instructions thereon for handling hand-offs in a cloud computing environment. The method includes identifying, at a cloud governance module of a computing or server device, a plurality of applications executing on a plurality of servers belonging to a plurality of cloud computing service providers. The method includes determining, at the cloud governance module, a plurality of governance policies associated with the identified plurality of applications, determining, at the cloud governance module, based upon information in a policy module, to hand-off an execution of at least one identified application executing on a first cloud computing service provider platform to a second cloud computing service provider, determining, at the cloud governance module, whether the second cloud computing service provider satisfies one or more governance policies associated with the at least one identified application, and handing-off, using the cloud governance module, the execution of the at least one identified application to a second cloud computing provider platform based upon the second cloud computing provider being compliant with the one or more governance policies associated with the at least one identified application, wherein the hand-off includes a transfer of a current state associated with the execution of the at least one identified application to the second cloud computing service platform.

Various other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION

Figure 1:
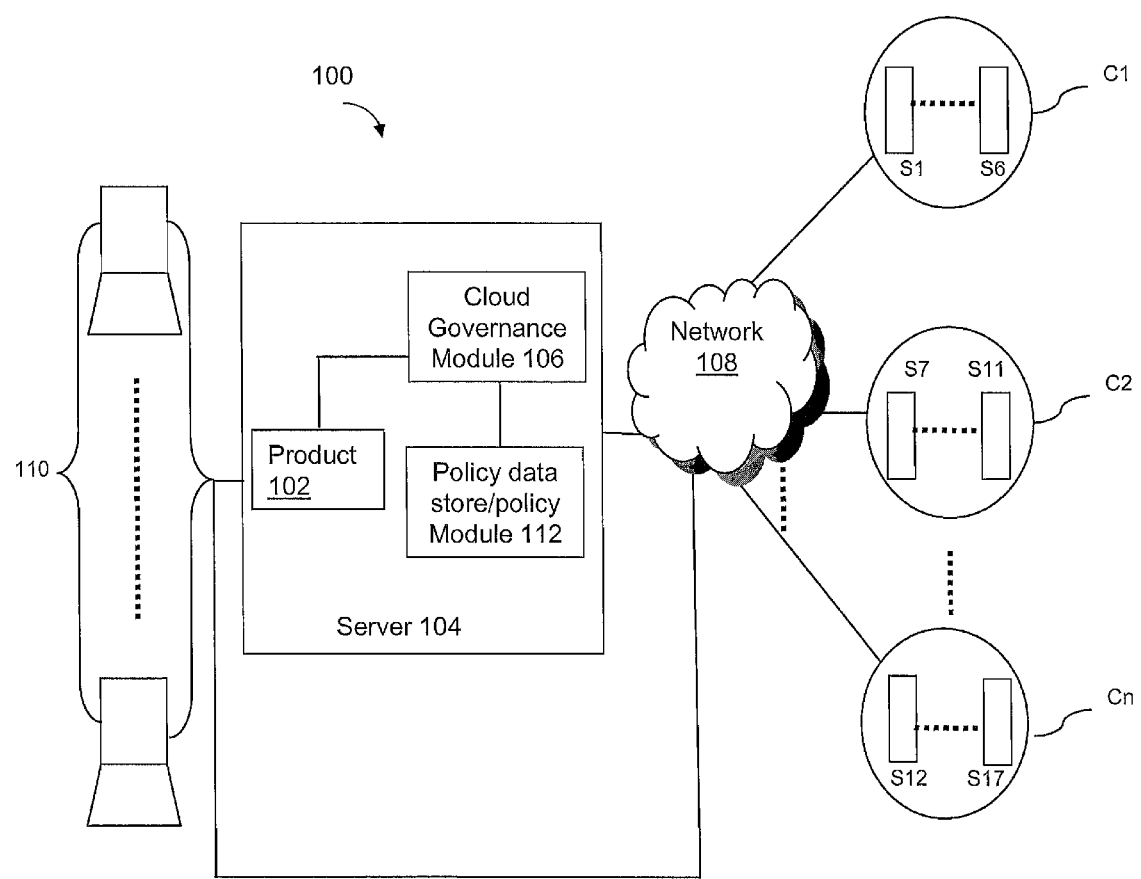
FIG. 1 is an illustration of an example system for handling hand-offs in a cloud computing environment, according to various implementations of the invention.

FIG. 1 is an exemplary illustration of an environment 100, which is an example of an environment 100 having a system for handling hand-offs of applications/service hosting between cloud vendors in a cloud computing environment. In some implementations, environment 100 includes, among other things, a server device 104, one or more client devices 110, one or more cloud computing service providers C1-Cn (interchangeably referred to herein as cloud vendors C1-Cn), and a network 108 for communication between various components of environment 100 via wired, wireless, optical, or other types of communication links.

In some implementations, server device 104 may include at least one hardware computing device having an operating system, disk drives, interfaces/ports, memory, buses, cooling sub-systems, and various software stored therein on tangible computer readable media. Specifically, in some implementations, server device 104 may include a cloud governance module or cloud governance system 106, as described below, for handling hand-offs of applications/service hosting between cloud vendors C1-Cn in a cloud computing environment, such as environment 100. In some implementations, server device 104, although shown separate from cloud vendors C1-Cn in environment 100, may be a part of one of cloud vendors C1-Cn. In some implementations, server device 104 may be a server supporting a plurality of applications for one or more client devices 110, for example, a product 102. In some implementations, server device 104 can include a security device that monitors various security aspects for an organization in environment 100. In some implementations, server device 104 may include or interface with one or more tangible computer-readable storage media configured to store one or more software modules, wherein the software modules include computer-readable instructions that when executed by one or more processors in server device 104 may cause the processors to perform the functions related to handling hand-offs of applications/service hosting between cloud vendors C1-Cn, as described herein. In some implementations, server device 104 may include computer hardware programmed with a computer application having one or more software modules that enable the various features and functions related to handling hand-offs of applications/service hosting between cloud vendors in a cloud computing environment, as described herein. It will be appreciated that in some implementations server device 104 may be located remote from a physical location of the organization (e.g., on a home computer of a user within the organization's network), and various implementations of the present invention are not limited by the location of server device 104. Further, although one server device 104 is shown, in some implementations, cloud vendors C1-Cn may communicate in parallel or in series with a plurality of different types of server devices including but not limited to mobile and desktop client computing devices.

In some implementations, cloud governance module 106 may be implemented using one or more programming languages such as C, Java, or other programming languages known to one of ordinary skill in the art. In some implementations, cloud governance module 106 may include instructions causing the processors of server device 104 to perform the features and functions described herein for enforcing governance and policy compliance of applications (e.g., product 102). For example, such features and functions may include identifying, at cloud governance module 106, a plurality of applications executing on a plurality of servers S1-S17 belonging to a plurality of cloud computing service providers C1-Cn, determining a plurality of governance policies associated with the identified plurality of applications, determining, at the cloud governance module, to hand-off an execution of at least one identified application executing on a first cloud computing service provider platform (e.g., a WINDOWS® operating system platform of cloud vendor C1, provided by Microsoft Corporation of Redmond, Wash., customized in one implementation) to a second cloud computing service provider platform (e.g., a differently customized WINDOWS® operating system platform of cloud vendor C2). In some implementations, such determination to switch or hand-off may be triggered by information received from a policy module 112 (interchangeably referred to as a policy data store 112 or a policy database 112). The features and functions may include determining whether the second cloud computing service provider satisfies one or more governance policies associated with the at least one identified application. If the second cloud computing provider is compliant with the one or more governance policies associated with the at least one identified application, handing-off the execution of the at least one identified application to a second cloud computing provider platform is carried out. The hand-off may include a transfer of a current state associated with the execution of the at least one identified application to the second cloud computing service platform.

In some implementations, a product 102 is used by a user of an organization at one of client devices 110 and partially supported by server device 104 or other server (e.g., one or more of servers S1-S17). Product 102 may be one of a plurality of products that are partially supported by server device 104 or other servers (e.g., one or more of servers S1-S17). In some implementations, product 102 may be an application executing on server device 104 but presented to a user at one of client devices 110 and supported by one of cloud vendors C1-Cn. In some implementations, product 102 may be a dormant application that can be executed based upon either user actions, electronic communication received from cloud vendors C1-Cn, or upon receipt of controlling electronic communications from an external device (e.g., a system administrator server, not shown). In some implementations, product 102 may be a software product (e.g., a software application or software module) managed by cloud governance module 106. In some implementations, product 102 may be a hardware product (e.g., a printing device) managed by cloud governance module 106. Generally, product 102 may be any resource or asset used by an organization utilizing cloud governance module 106 for implementing computing or workflow needs. Further, it will be appreciated that product 102 may be located remote from a physical location of the organization (e.g., on a home computer of a user within the organization's network), and various implementations of the present invention are not limited by the location of product 102.

In some implementations, as noted earlier, server device 104 may include policy module 112. In some implementations, policy module 112 may be a database storing policies in a memory device (e.g., one or the one or more memory devices in server device 104). Policies stored in and/or implemented by policy module 112 may facilitate an organization's needs related to compliance (e.g., security compliance, compliance to a service level agreement, or the like). The policies stored in and/or enforced by policy module 112 may include various policies that an organization would use to define the aspects that organization wants to be compliant for. By way of example only and not by way of limitation, in some implementations, such policies include policies for evaluating cloud vendors C1-Cn. For example, cloud governance module 106 may search for services across different cloud vendors C1-Cn and understand their respective services, costs, and other parameters (e.g., availability) through their published information. That is, cloud governance module 106 may know what it is looking for (e.g., operating system information, network interface cards (NICs), or applications) and based on what is available with different cloud vendors C1-Cn, may narrow on the most suitable or compliant (or, "best") vendor that may satisfy the criteria from the policies in policy module 112. In some implementations, system administrators may create profiles and resources that match these profiles from a particular cloud in cloud vendors C1-Cn that is searched. In some implementations, governance, risk, and compliance (GRC) profiles, described below, for the cloud resources can be searched. Such searched GRC profiles may be compared with stored governance policies (e.g., hand-off policies) in policy module 112, or with policies stored elsewhere in server device 104.

By way of example only, the policies can be implemented in policy module 112, cloud governance module 106, or both, using Extensible Markup Language (XML) and be stored as an XML format file, e.g., in policy module 112 of server device 104, or any other device with storage that is capable of communicating with server device 104 internally and/or externally. When in XML format, appropriate tags may be included in the policy files making the policies easy to extend as well as bring in the benefits of using a language like XML. In XML, a tag is what is written between angled brackets, i.e., XML tags open with a "<" symbol and close or end with a ">" symbol. The tags are indicated in matched pairs, with defined elements, rules, or policies between the open and close tag. For example, <composer> is an example for an opening tag and the corresponding closing tag would be </composer>. Tags identify and include various parameters, variables, and attributes that universally define the policies. Since XML tags are known to those of ordinary skill in the art, they will not be further described. An advantage of using XML format is that XML has a more universal acceptance among different cloud vendors, although other customized implementations of policies in other computer languages may be used.

In some implementations, policies may include operational control requisites of applications and hosts (e.g., servers S1-S17 of respective cloud vendors C1-Cn) in environment 100. For example, policies may specify requirements for a need to have Simple Network Management Protocol (SNMP) enabled, have standards on a specific update of the Operating System that is to be used in software production environments, or other hardware or software rules such as capabilities to specify GRC profiles for assets to be classified and protected based on the security levels and applications used. In some implementations, there are the policies that are needed for trusted hand-offs across multiple cloud vendors C1-Cn. In some implementations, the policies include rules/methods for facilitating hand-offs of execution of product 102 between cloud vendors C1-Cn in trusted ways.

In some implementations, server device 104, or other server of environment 100, may include an application module (not shown). Application module supports various software applications (e.g., product 102) used by a user of server device 104 at one of client devices 110. Such applications include, but are not restricted to, network applications, word processing and spreadsheet applications, and the like. In some implementations, application module includes a plurality of products that are supported by server device 104 such as product 102 or applications executing on server device 104 or other server and supported by one of cloud vendors C1-Cn. In some implementations, the applications are dormant applications that can be executed based upon either user actions, electronic communication received from cloud vendors C1-Cn, or upon receipt of controlling electronic communications from an external device (e.g., a system administrator server, not shown). Generally, application module supports resources or assets used by an organization in environment 100 for implementing computing or workflow needs.

In some implementations, client devices 110 interact, directly or indirectly through server device 104, with a plurality of cloud computing service providers C1-Cn via wired, wireless, optical, or other types of communication links over network 108 known to one of ordinary skill in the art. Client devices 110 are computing devices known to those of ordinary skill in the art (e.g., mobile or desktop computing devices). In some implementations, one or more client devices 110 may access resources provided by cloud vendors C1-Cn directly without routing the requests through server device 104 as shown in FIG. 1. In some implementations, one or more client devices 110 may access resources provided by cloud vendors C1-Cn through server device 104 (e.g., when executing an application such as product 102 provided by one of cloud vendors C1-Cn).

In some implementations, network 108 may be the Internet or the World Wide Web ("www"). In some implementations, network 108 may be a switching fabric that is part of a Wide Area Network (WAN), Local Area Network (LAN), or other types of networks known to those of ordinary skill in the art (e.g., a TCP/IP network). In some implementations, network 108 routes requests from server device 104 and/or client devices 110 for accessing various resources provided by cloud vendors C1-Cn.

In some implementations, a plurality of cloud vendors C1-Cn in environment 100 each include one or more servers (e.g., servers S1-S6 in cloud vendor C1, servers S7-S10 in cloud vendor C2, and servers S12-S17 in cloud vendor Cn) that provide various services to server device 104, or otherwise provide access services to product 102 that are associated with applications/services. Further, any number of servers communicably connected in known ways may be used as appropriate for cloud vendors C1-Cn and the number and types of connections shown for the servers S1-S17 in FIG. 1 is by way of example only and not by way of limitation. In some implementations, cloud vendors C1-Cn are internal to the customer/business organization using environment 100. In some implementations, cloud vendors C1-Cn are external to the customer/business organization. An example of cloud vendors C1-Cn can include cloud computing services provided by Amazon.com, Inc. of Seattle, Wash., although other vendors may be used.

Figure 2A:
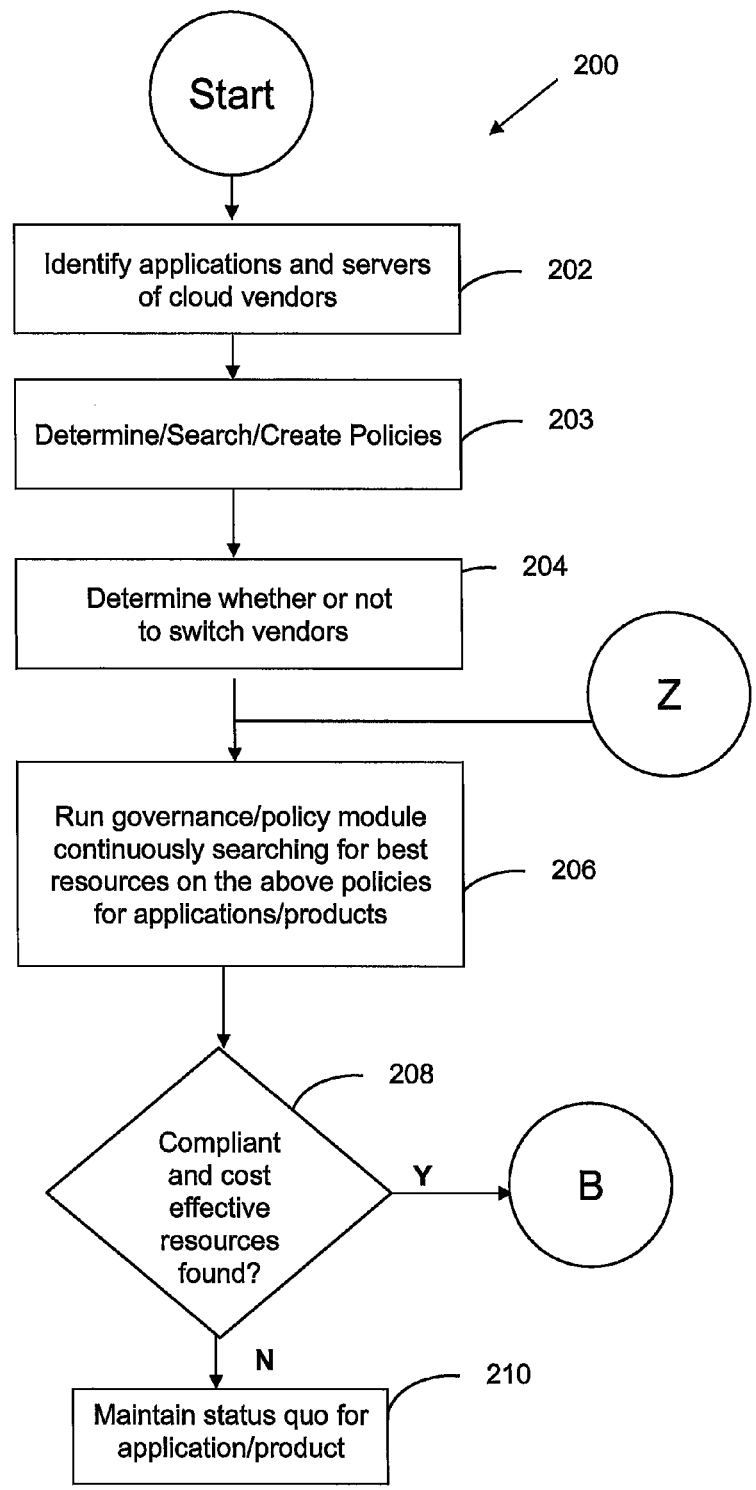
FIGS. 2A and 2B illustrate an example process for handling hand-offs in a cloud computing environment, according to various implementations of the invention.
Figure 2B:
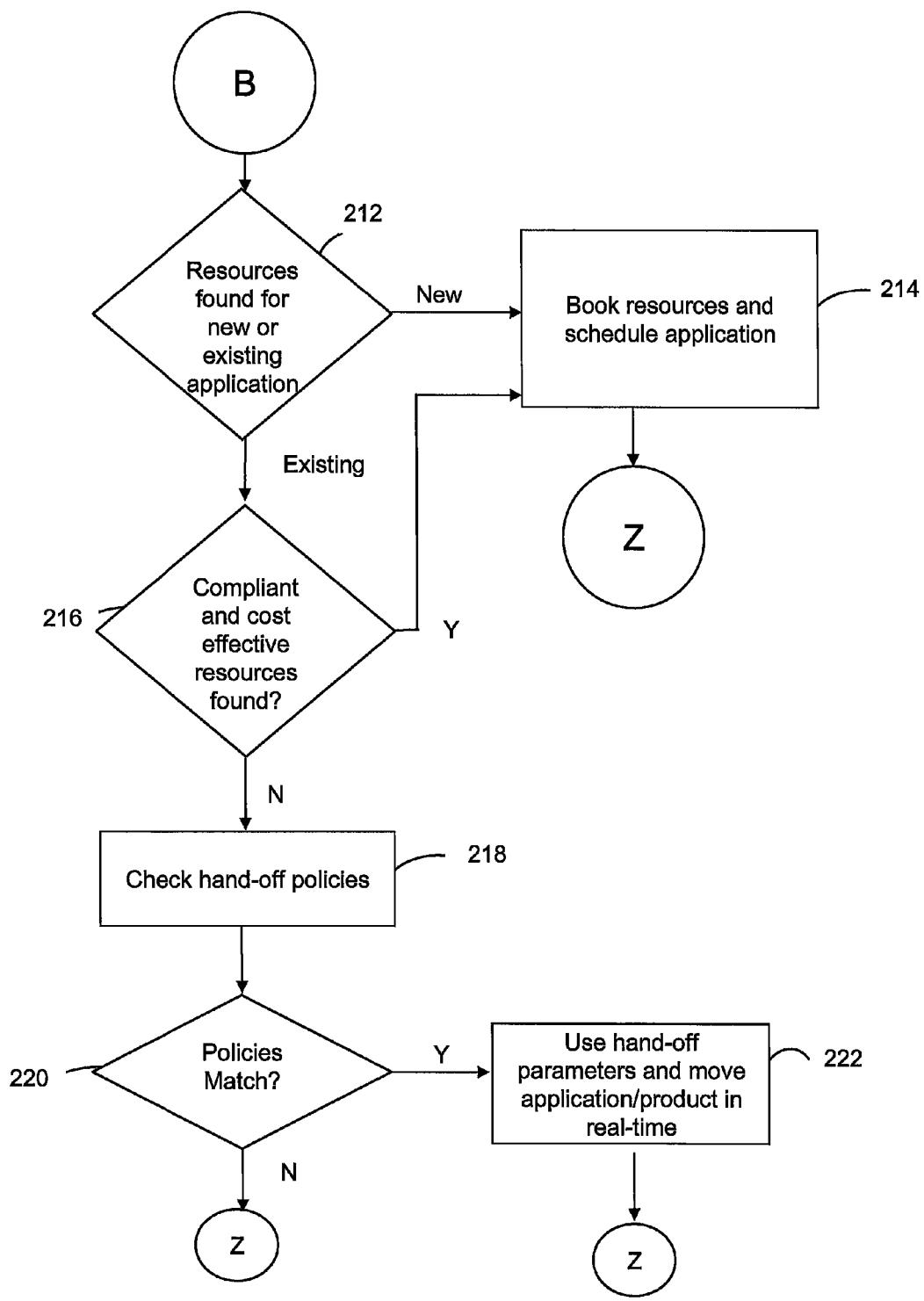

FIGS. 2A and 2B illustrate a process 200 which is an example of a process for handling hand-offs in a cloud computing environment (e.g., environment 100). The described operations of process 200 may be accomplished using one or more of modules/sub-modules described herein and in some implementations, various operations may be performed in different sequences. In some implementations, additional operations may be performed along with some or all of the operations shown in FIGS. 2A and 2B. In some implementations, one or more operations may be performed simultaneously. In some implementations, one or more of operations may not be performed. Accordingly, the operations described are exemplary in nature and, as such, should not be viewed as limiting.

Referring to FIG. 2A, in an operation 202, cloud governance module 106 may identify an application (e.g., product 102) executing on one or more servers (e.g., servers S1-S6, S7-S11, or S12-S17) belonging to a respective plurality of cloud computing service providers C1-Cn. In some implementations, cloud governance module 106 carries out such identification using stored lists or data associated with product 102, and other applications/services. In some implementations, the stored lists or data may be stored in one or more memory devices of server device 104. Stored list or data include specific details related to an application (e.g., product 102). These specific details may include, for example, a type of the application, a platform on which the application runs, a time when the application typically runs, input and output for the application, and the like. New applications can be added, for example, to a dynamic list maintained or stored in one or more memory devices of server device 104.

In an operation 203, cloud governance module 106 identifies one or more governance policies associated with the identified applications (e.g., product 102) and servers supporting those applications. Such policies may be stored, for example, at policy module 112 of server device 104. By way of example only and not by way of limitation, policies include governance policies associated with network security, hand-off management, network protocols, application support, network hardware support, user authentication, operating system requirements, audit compliance, user and cloud computing provider profile management, types of applications supported by cloud vendors C1-Cn, storage parameters, network operability, energy efficiency ("green" vendors), application version, user security profiles, support for helpdesk applications, and the like. For example, a set of policies may be in the form of XML tagged file stored in policy module 112 and/or one or more memory devices of server device 104 having instructions such as: "search only 64 bit operating system hosts with 2 NIC cards and turn on network protocol management, Telnet and File Transfer Protocol." In some implementations, the policies could be related to GRC profiles including, for example, documenting user log-on and log-off with time stamps only.

In some implementations, if no policies are found or are identifiable for one or more identified applications, cloud governance module 106 may create one or more policies. The policies may be created using, for example, a graphical user interface (GUI) or an XML file directly by manipulating the XML file without going through a user interface. In some implementations, cloud governance module 106 may search GRC policies for the resources to be searched on cloud vendors C1-Cn. For example, such searching may include determining what to search for across cloud vendors C1-Cn. The GRC policies are profiles for hosts/servers that indicate what kind of systems are being searched for by cloud governance module 106 from a compliance perspective. In some implementations, cloud governance module 106 may create policies using GUI or XML file directly for trusted hand-offs of active and/or dormant applications across cloud vendors C1-Cn whenever issues related to operational efficiency (for example, with respect to cost, time saved executing the applications, and the like) are detected by cloud governance module 106. In such an implementation, the GUI or XML files may be stored in one or more memory devices of server device 104 linked to or within policy module 112. By way of example only, a trusted hand-off policy can indicate that a cloud vendor among cloud vendors C1-Cn never be scheduled to run finance applications and another cloud vendor always run storage applications but no finance applications. Generally, the trusted hand-off policy may be applied to any kind of application (including, e.g., product 102). For example, if there is a low cost vendor whose security is not assured, but is of interest from a cost perspective nonetheless, a policy to exclude that vendor from participating in searches for any sensitive applications can be set. In some implementations, if there is a vendor that is known to consistently be the least cost vendor, all non-sensitive, non-critical applications may be scheduled on that vendor's devices, by default.

In some implementations, creation of new policies may include updating already existing policies in policy module 112. Such creation of new policies may be triggered, for example, by one or more new applications being added to a list of applications maintained by server device 104 and executing on one or more of servers S1-S17 of cloud vendors C1-Cn.

In an operation 204, cloud governance module 106 makes a determination to switch between or hand-off an execution of at least one identified application (e.g., product 102) executing on a first cloud computing service provider platform (e.g., C1's server platform) to a second cloud computing service provider (e.g., C2's server platform). In some implementations, such determination may be made based upon information stored in policy module 112. In some implementations, such determination may be triggered by cloud governance module 106 receiving a notification from the first cloud computing service provider (e.g., C1) of an inability to support executing at least one identified application at a future instance of time. In some implementations, such determination may be triggered by cloud governance module 106 receiving another notification from a system administrator of environment 100 regarding an availability of a better application support capability and/or cost effectiveness of the second cloud computing service provider (e.g., C2). In some implementations, such determination may be triggered by cloud governance module 106 receiving yet another notification from a security device in the computing device regarding a security breach detected at the first cloud computing service provider (e.g., C1). In some implementations, a change in policies may prompt cloud governance module 106 to initiate hand-off of product 102.

In response to such determination to switch, in an operation 206, cloud governance module 106 searches for cloud vendors having resources that are acceptable according to the policies associated with applications/services (e.g., product 102) at issue. In some implementations, such resources may be continuously searched, they may be searched at periodic time intervals, or at random instances of time on an "as-needed" basis. In some implementations, cloud governance module 106 may utilize policy module 112 for searching for such resources. Examples of such resources include, but are not limited to hardware storage space, operating system, connection bandwidth, processing capability, and the like. For example, cloud governance module 106 may search for better resources in terms of cost of operation, security strength, support platform type, resource utilization, and/or other parameters useful for executing product 102 in the best or optimum manner, as can be appreciated by those of ordinary skill in the art. In some implementations, cloud vendors C1-Cn may bid for such resources upon receiving an indication from cloud governance module 106 that a search for such vendors and/or resources for a new or existing application has been initiated. In some implementations, each of cloud vendors C1-Cn publishes information about services it offers (cost, capacity, size etc), for example, through web-services. In some implementation, the search uses the published information to determine a cloud vendor among cloud vendors C1-Cn that is acceptable according to the policy of the application at issue.

In an operation 208, using one or more processors in server device 104, cloud governance module 106, determines whether or not resources compliant with policies in policy module 112 and cost-effective to run one or more applications (e.g., product 102) were found. In some implementations, cloud governance module 106 may rely upon published web-services, application programming interfaces (APIs), or the like to perform such determination of availability of compliant resources.

If a new vendor is not found, in an operation 210, cloud governance module 106 may maintain status quo and continue execution of the applications on the cloud vendor in the plurality of cloud vendors C1-Cn on which the applications were currently or previously being supported. In this scenario, cloud governance module 106 may ignore the indication to switch the execution of identified application (e.g., product 102) to a different cloud vendor (e.g., since there may be a compromise on policy enforcement if the switching of execution of the identified application is carried out). In some implementations, if there is an unconditional request or indication to switch, cloud governance module 106 may switch to a different cloud vendor but with limited functionalities of the executing application being offered to a user of server device 104 since the new cloud vendor on which the application is executed may not be the best cloud vendor among cloud vendors C1-Cn in terms of policy enforcement.

However, when in operation 208 cloud governance module 106 detects or determines that better policy compliant resources exist in cloud vendors C1-Cn, the flow proceeds to FIG. 2B were in, an operation 212, cloud governance module 106 then determines whether the resources found are for a new or a dormant application or for an already existing application (e.g., product 102 on server device 104). For example, independent of whether an application is running on server device 104 or other server, cloud governance module 106 may by itself proactively perform search for cloud vendors that are best suited (e.g., as part of optimizing cloud vendor costs for the customer) for various applications/services. In such situations, cloud governance module 106 may obtain resources that may be for applications that are not currently active, but are frequently active on server device 104, or applications that cloud governance module 106 may support in the future (i.e., new applications). In some implementations, cloud governance module 106 may obtain resources for an already executing application or service (e.g., product 102). In some implementations, such detection of whether resources obtained are for new or already existing applications, is carried out by cloud governance module 106 using parameters from the published services and information about existing applications. For example, a storage application may require 100 TB of space and the current cloud vendor charges $100 for 100 TB of space. Using published service information from another vendor in cloud vendors C1-Cn, cloud governance module 106 finds that the other vendor is providing same space for $70. In such a scenario, there is optimization of costs possible and cloud governance module 106 will initiate the move to the other vendor that offers the same storage space at a lower cost, albeit under same compliance with policies as the prior cloud vendor, or upon satisfying optimum performance metrics related to compliance with policies. In some implementations, such cost analysis may be tied to policies stored in policy module 112. For example, such cost analysis may itself be a policy stored in policy module 112.

If the resources are determined to be for a new application, in an operation 214, cloud governance module 106 books/reserves those resources and schedules the new application for continuing execution on one of the cloud vendors C1-Cn on which the resources were found, and the flow returns to operation 206. In some implementations, booking may be performed through any Web Services APIs known to one of ordinary skill in the art. For example, Elastic Compute Cloud® (EC2) provided by Amazon.com, Inc. of Seattle, Wash. publishes a well defined set of Web-Services carry out various actions including booking of resources, which may be used to carry out the booking.

However, if the resources found are determined to be for an existing executing application (e.g., product 102), cloud governance module 106 determines, in an operation 216, whether or not the cloud vendor in the plurality of cloud vendors C1-Cn that has the found resources is the same cloud vendor (e.g., C1) that is currently executing the existing application (e.g., product 102). If yes, cloud governance module carries out operation 214 again, if needed, or else simply continues the execution of the existing application (e.g., product 102), and the flow of process 200 then returns to operation 206 in FIG. 2A via connector Z.

If the better resources are found at a cloud vendor different from the cloud vendor that is executing the existing application (e.g., product 102), in an operation 218, cloud governance module 106 then checks hand-off policies in policy module 112 such that the existing executing application (e.g., product 102) can be transferred to the new cloud vendor in the plurality of cloud vendors C1-Cn without disruption in the execution of the existing application. In some implementations, to ensure no disruption of the executing application(s) (e.g., product 102), the server/system on a second cloud vendor is readied while the application is still executing on the first server of the first cloud vendor by allocating hardware and/or software resources on the second cloud vendor for continuing execution of the application. Once the second server is ready, the application from the first server will be moved by cloud governance module 106 to the second and will start executing from the point where it left off on the first server. In some implementations, hand-off policies are defined as those governance policies that facilitate hand-off of the executing application (e.g., product 102) to a new cloud vendor in cloud vendors C1-Cn. The hand off policies may have additional information like how much of the executing application (e.g., product 102) has been completed, what are the current parameters associated with the application that are being processed, what is the intermediate output of such processing, what are the other systems/servers that are participating in the execution of the application. In some implementations, cloud governance module 106 may retrieve the hand-off policies from policy module 112. By way of example only, such hand-off policies include but are not limited to determining at what stage of completion a current executing application is at. For example, product 102 may be at an 80% completion level with cloud vendor C1, and cloud governance module 106 may determine not to switch to a different cloud vendor (e.g., C2) at such an advanced state of completion and may by-pass such a determination to switch.

In some implementations, checking carried out in operation 218 includes determining, at cloud governance module 106, whether the second cloud computing service provider satisfies one or more governance policies (e.g., hand-off policies) associated with the at least one identified application. This determination can include one or more of determining an existence of the one or more policies at cloud governance module 106 or policy module 112, or both, updating the one or more existing policies at cloud governance module 106 or policy module 112, or both, as discussed with respect to operation 202, and creating a new set of policies when the one or more policies are determined to be non-existent, as also discussed with respect to operation 202. The newly created policies may then be stored in policy module 112. Since the executing application is being moved in real time from one vendor servers to other vendor's servers, this could give rise to a situation where the executing application is mid-way in its execution. Such a situation may entail transfer of context information, described below, associated with the execution of the application to the other vendor so that the executing application continues where it was left at the first vendor and not start all the way from beginning.

In an operation 220, cloud governance module 106 determines whether or not the retrieved policies match with respect to the selected cloud vendor to which the existing executing application is to be handed-off to. Such matching involves comparing various hand-off parameters such as how much of the executing application (e.g., product 102) has been completed, what are the current parameters associated with the application that are being processed, what is the intermediate output of such processing, what are the other systems/servers that are participating in the execution of the application with corresponding parameters of the new cloud vendor. If the policies do not match, cloud governance module 106 does not transfer the existing executing application (e.g., product 102) to the new cloud vendor, and the flow returns to operation 206.

However, if the policies match, then flow of process 200 proceeds to an operation 222 via connector Z, cloud governance module 106 uses the hand-off parameters and moves or transfers the existing executing application (e.g., product 102) in real-time without any disruption in execution to the new cloud vendor. For example, a current state or current snapshot of the executing application may be captured using, for example information related to how much of the executing application (e.g., product 102) has been completed, what are the current parameters associated with the application that are being processed, what is the intermediate output of such processing, what are the other systems/servers that are participating in the execution of the application, and the like. In some implementations, automation tools known to those of ordinary skill in the art may be used to transfer these operating system and application images with their current snapshot from one vendor system to other may be transferred, after hand-off policies associated with the executing application have been complied with. The new selected cloud vendor among cloud vendors C1-Cn is determined by cloud governance module 106 to be most acceptable cloud computing service provider in the plurality of cloud computing service providers C1-Cn with respect to policy enforcement and compliance. For example, the new selected cloud vendor may meet threshold performance metrics of being the most optimum cost effective cloud vendor with respect to the identified executing application (e.g., product 102). Such identification of the new cloud vendor may include searching for one or more resources (e.g., hardware device(s) on one or more of servers S7-S11) for use by the at least one identified application (e.g., product 102).

The handing-off of the existing executing application (e.g., product 102) to the new cloud vendor occurs with a transfer of an appropriate context associated with the application. The term "context" refers to a current state of execution of the application (e.g., product 102), the current state being stored in buffer or memory devices in server device 104. For example, if a backup application is being run and is 60% complete, the 60% completion becomes part of context information that should be passed to another cloud vendor among cloud vendors C1-Cn so that backup restarts from where it was left instead of from the beginning. The context of the application (e.g., product 102) for the hand-off determines the success of the application to be completed successfully. For example, in case of the context as part of the hand-off, some exemplary parameters that would form the part of the environment of the existing executing application (e.g., product 102) that needs to be carried to the next vendor include but are not limited to an operating system and version update, application specifics (e.g., version of application, current state of the application, does application have failover options, or combinations thereof), application in progress, a current state of the application stored, for example, as a state machine in one or more memory devices of server device 104, pre-requisites for the application, percentage of application completed, current inputs, current output parameters, whether application running is invoked by user or as part of scheduled batch, and the like. During the transfer of the execution, the context may be stored or buffered in one or more of the remaining servers too to facilitate smooth/uninterrupted real-time transition without any disruption. These parameters will enable the hand-off to be transparent to the end customer and make it happen dynamically based on the policies set forth by the customer on one or more of client devices 110. In some implementations, the handing-off is carried out by cloud governance module 106 in real-time such that the current state of the execution of the at least one identified application (e.g., product 102) is used by the second cloud computing service provider platform to continue the execution of the at least one identified application after the handing-off is completed. In some implementations, the term "real-time" refers to handling hand-off when a triggering event occurs, and not later after the triggering event has expired or the application/product has completed execution and becomes dormant. For example, such real-time transfer is triggered if operational efficiencies become an issue, or if an application runs into problem(s) during execution. In some implementations, when the at least one identified application is detected to be dormant, the handing-off is carried out using a set of parameters associated with the at least one identified application stored at server device 104 (e.g., in one or more memory device) such that the dormant application becomes active and is executed on a policy compliant cloud computing vendor's server.

Embodiments are provided according to the following number clauses:

1. A method for handling hand-offs in a cloud computing environment, comprising:

identifying, at a cloud governance module of a server device, a plurality of applications executing on a plurality of servers belonging to a plurality of cloud computing service providers;

determining, at the cloud governance module, a plurality of governance policies associated with the identified plurality of applications;

determining, at the cloud governance module, based upon information in a policy module, to hand-off an execution of at least one identified application executing on a first cloud computing service provider platform to a second cloud computing service provider;

determining, at the cloud governance module, whether the second cloud computing service provider satisfies one or more governance policies associated with the at least one identified application; and handing-off, using the cloud governance module, the execution of the at least one identified application to a second cloud computing provider platform based upon the second cloud computing provider being compliant with the one or more governance policies associated with the at least one identified application, wherein the handing-off comprises transferring a current state associated with the execution of the at least one identified application to the second cloud computing service platform.

2. The method of clause 1, wherein the plurality of governance policies include policies associated with one or more of:

network security, network protocols, application support, network hardware support, user authentication, operating system requirements, audit compliance, user and cloud computing provider profile management, types of applications supported by the first and the second cloud computing service providers, storage parameters, and network operability.

3. The method of clause 1, wherein the plurality of governance policies are stored in an Extensible Markup Language (XML) file format in the cloud governance module of the computing device.

4. The method of clause 1, wherein the determining to hand-off the execution comprises at least one of:

receiving, at the cloud governance module, a first notification from the first cloud computing service provider of an inability to support executing the at least one identified application at a future instance of time;

receiving, at the cloud governance module, a second notification from a system administrator regarding an availability of a better application support capability and/or cost effectiveness of the second cloud computing service provider; and receiving, at the cloud governance module, a third notification from a security device in the computing device regarding a security breach detected at the first cloud computing service provider.

5. The method of clause 1, wherein the handing-off occurs without a disruption in the execution of the at least one identified application.

6. The method of clause 1, wherein the determining whether the second cloud computing provider satisfies one or more governance policies associated with the at least one identified application further comprises:

determining an existence of the one or more policies at the cloud governance module;

updating the one or more existing policies at the cloud governance module; and creating a new set of policies when the one or more policies are determined to be non-existent.

7. The method of clause 1, wherein the determining whether the second cloud computing provider satisfies one or more governance policies associated with the at least one identified application comprises searching for one or more resources for use by the at least one identified application.

8. The method of clause 1, wherein the handing-off is carried out in real-time such that the current state of the execution of the at least one identified application is used by the second cloud computing service provider platform continue the execution of the at least one identified application after the handing-off is completed.

9. The method of clause 1, wherein when the at least one identified application is detected to be dormant, the handing-off is carried out using a set of parameters associated with the at least one identified application stored at the computing device.

10. The method of clause 1, wherein the second cloud computing service provider is determined by the cloud governance module to be selected based upon satisfying optimum performance metric conditions required for the execution of the at least one identified application.

11. A tangible computer-readable storage medium having one or more computer-readable instructions thereon for handling hand-offs in a cloud computing environment, which when executed by one or more processors cause the one or more processors to:

identify, at a cloud governance module of a server device, a plurality of applications executing on a plurality of servers belonging to a plurality of cloud computing service providers; determine, at the cloud governance module, a plurality of governance policies associated with the identified plurality of applications;

determine, at the cloud governance module, based upon information in a policy module, to hand-off an execution of at least one identified application executing on a first cloud computing service provider platform to a second cloud computing service provider;

determine, at the cloud governance module, whether the second cloud computing service provider satisfies one or more governance policies associated with the at least one identified application; and hand-off, using the cloud governance module, the execution of the at least one identified application to a second cloud computing provider platform based upon the second cloud computing provider being compliant with the one or more governance policies associated with the at least one identified application, wherein the hand-off comprises a transfer of a current state associated with the execution of the at least one identified application to the second cloud computing service platform.

12. The tangible computer-readable storage medium of clause 11, wherein the plurality of governance policies include policies associated with one or more of:

network security, network protocols, application support, network hardware support, user authentication, operating system requirements, audit compliance, user and cloud computing provider profile management, types of applications supported by the first and the second cloud computing service providers, storage parameters, and network operability.

13. The tangible computer-readable storage medium of clause 11, wherein the plurality of governance policies are stored in an Extensible Markup Language (XML) file format in the cloud governance module of the computing device.

14. The tangible computer-readable storage medium of clause 11, wherein the one or more instructions further cause the one or more processors to perform at least one of:

receiving, at the cloud governance module, a first notification from the first cloud computing service provider of an inability to support executing the at least one identified application at a future instance of time;

receiving, at the cloud governance module, a second notification from a system administrator regarding an availability of a better application support capability and/or cost effectiveness of the second cloud computing service provider; and receiving, at the cloud governance module, a third notification from a security device in the computing device regarding a security breach detected at the first cloud computing service provider.

15. The tangible computer-readable storage medium of clause 11, wherein the hand-off occurs without a disruption in the execution of the at least one identified application.

16. The tangible computer-readable storage medium of clause 11, wherein the one or more instructions further cause the one or more processors to:

determine an existence of the one or more policies at the cloud governance module;

update the one or more existing policies at the cloud governance module; and create a new set of policies when the one or more policies are determined to be non-existent.

17. The tangible computer-readable storage medium of clause 11, wherein the one or more instructions further cause the one or more processors to search for one or more resources for use by the at least one identified application.

18. The tangible computer-readable storage medium of clause 11, wherein the hand-off is carried out in real-time such that the current state of the execution of the at least one identified application is used by the second cloud computing service provider platform continue the execution of the at least one identified application after the hand-off is completed.

19. The tangible computer-readable storage medium of clause 11, wherein when the at least one identified application is detected to be dormant, the hand-off is carried out using a set of parameters associated with the at least one identified application stored at the computing device.

20. The tangible computer-readable storage medium of clause 11, wherein the second cloud computing service provider is determined by the cloud governance module to be selected based upon satisfying optimum performance metric conditions required for the execution of the at least one identified application.

21. A system for handling hand-offs in a cloud computing environment, the system comprising:

one or more processors configured to:

identify, at a cloud governance module of a server device, a plurality of applications executing on a plurality of servers belonging to a plurality of cloud computing service providers; determine, at the cloud governance module, a plurality of governance policies associated with the identified plurality of applications;

determine, at the cloud governance module, based upon information in a policy module, to hand-off an execution of at least one identified application executing on a first cloud computing service provider platform to a second cloud computing service provider;

determine, at the cloud governance module, whether the second cloud computing service provider satisfies one or more governance policies associated with the at least one identified application; and hand-off, using the cloud governance module, the execution of the at least one identified application to a second cloud computing provider platform based upon the second cloud computing provider being compliant with the one or more governance policies associated with the at least one identified application, wherein the hand-off comprises a transfer of a current state associated with the execution of the at least one identified application to the second cloud computing service platform.

22. The system of clause 21, wherein the plurality of governance policies include policies associated with one or more of:

network security, network protocols, application support, network hardware support, user authentication, operating system requirements, audit compliance, user and cloud computing provider profile management, types of applications supported by the first and the second cloud computing service providers, storage parameters, and network operability.

23. The system of clause 21, wherein the plurality of governance policies are stored in an Extensible Markup Language (XML) file format in the cloud governance module of the computing device.

24. The system of clause 21, wherein the one or more processors are further configured to perform at least one of:

receiving, at the cloud governance module, a first notification from the first cloud computing service provider of an inability to support executing the at least one identified application at a future instance of time;

receiving, at the cloud governance module, a second notification from a system administrator regarding an availability of a better application support capability and/or cost effectiveness of the second cloud computing service provider; and receiving, at the cloud governance module, a third notification from a security device in the computing device regarding a security breach detected at the first cloud computing service provider.

25. The system of clause 21, wherein the hand-off occurs without a disruption in the execution of the at least one identified application.

26. The system of clause 21, wherein the one or more processors are further configured to:

determine an existence of the one or more policies at the cloud governance module;

update the one or more existing policies at the cloud governance module; and create a new set of policies when the one or more policies are determined to be non-existent.

27. The system of clause 21, wherein the one or more processors are further configured to search for one or more resources for use by the at least one identified application.

28. The system of clause 21, wherein the hand-off is carried out in real-time such that the current state of the execution of the at least one identified application is used by the second cloud computing service provider platform continue the execution of the at least one identified application after the hand-off is completed.

29. The system of clause 21, wherein when the at least one identified application is detected to be dormant, the hand-off is carried out using a set of parameters associated with the at least one identified application stored at the computing device.

30. The system of clause 21, wherein the second cloud computing service provider is determined by the cloud governance module to be selected based upon satisfying optimum performance metric conditions required for the execution of the at least one identified application.

Implementations of the invention may be made in hardware, firmware, software, or various combinations thereof. The invention may also be implemented as computer-readable instructions stored on a tangible computer-readable storage medium which may be read and executed by one or more processors causing the processor to perform the features and functions therein. A computer-readable storage medium may include various mechanisms for storing information in a form readable by a computing device. For example, a tangible computer-readable storage medium may include optical storage media, flash memory devices, disks, and/or other storage mediums. Further, firmware, software, routines, or instructions may be described in the above disclosure in terms of specific exemplary aspects and implementations of the invention, and performing certain actions. However, it will be apparent that such descriptions are merely for convenience, and that such actions may in fact result from computing devices, processors, controllers, or other devices executing firmware, software, routines or instructions.

Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method to handle a hand-off in a cloud computing environment, the method comprising:

determining to hand-off execution of an application executing on a platform of a first cloud computing service provider to a second cloud computing service provider;

determining, at a server device, whether the second cloud computing service provider satisfies a policy associated with the application; and handing-off, using the server device, the execution of the application to a platform of the second cloud computing provider based upon the second cloud computing provider being compliant with the policy associated with the application, wherein the handing-off comprises transferring a current state associated with the execution of the application to the second cloud computing service platform.

2. The method of claim 1, wherein the policy comprises a policy associated with one or more selected from: network security, a network protocol, application support, network hardware support, user authentication, an operating system requirement, audit compliance, user and cloud computing provider profile management, type of application supported by the first and the second cloud computing service providers, a storage parameter, and/or network operability.

3. The method of claim 1, wherein the determining to hand-off the execution comprises at least one selected from:

receiving, at the server device, a first notification from the first cloud computing service provider of an inability to support executing the application at a future instance of time;

receiving, at the server device, a second notification from a system administrator regarding an availability of a better application support capability and/or cost effectiveness of the second cloud computing service provider; and/or receiving, at the server device, a third notification from a security device regarding a security breach detected at the first cloud computing service provider.

4. The method of claim 1, wherein the handing-off occurs without a disruption in the execution of the application.

5. The method of claim 1, wherein the determining whether the second cloud computing provider satisfies the policy associated with the application further comprises:
   determining an existence of the policy;
   creating a new policy responsive to the policy being determined to be non-existent; and
   updating the existing policy.

6. The method of claim 1, wherein the determining whether the second cloud computing provider satisfies the policy associated with the application comprises searching for a resource for use by the application.

7. The method of claim 1, wherein the handing-off is carried out in real-time such that the current state of the execution of the application is used by the second cloud computing service provider platform to continue the execution of the application after the handing-off is completed.

8. The method of claim 1, wherein responsive to the application being detected to be dormant, the handing-off is carried out using a set of parameters associated with the application.

9. The method of claim 1, wherein the second cloud computing service provider is selected based upon satisfying optimum performance metric conditions required for the execution of the application.

10. A method to handle a hand-off in a cloud computing environment, the method comprising:
   receiving, at a server device, information from a first cloud computing service provider and/or a second cloud computing service provider regarding an application executing on a platform of the first cloud computing service provider;
   determining, at the server device, to hand-off execution of the application executing on the platform of the first cloud computing service provider to the second cloud computing service provider based on the information and a determination that the first cloud computing service provider will be unable to support executing the application in the future, that the first cloud computing service provider is insecure, and/or that the second cloud computer service provider offers better application support capability and/or cost effectiveness for the application; and
   handing-off, using the server device, the execution of the application to a platform of the second cloud computing provider, wherein the handing-off comprises transferring a current state associated with the execution of the application to the second cloud computing service platform.

11. The method of claim 10, further comprising determining, at the server device, whether the second cloud computing service provider satisfies a policy associated with the application, and the handing-off the execution of the application is based upon the second cloud computing provider being compliant with the policy associated with the application.

12. The method of claim 11, wherein the policy comprises a policy associated with one or more selected from: network security, a network protocol, application support, network hardware support, user authentication, an operating system requirement, audit compliance, user and cloud computing provider profile management, type of application supported by the first and the second cloud computing service providers, a storage parameter, and/or network operability.

13. The method of claim 11, wherein the determining whether the second cloud computing provider satisfies the policy associated with the application comprises searching for a resource for use by the application.

14. The method of claim 10, wherein the receiving information comprises at least one selected from:
   receiving, at the server device, a first notification from the first cloud computing service provider of an inability to support executing the application at a future instance of time;
   receiving, at the server device, a second notification from a system administrator regarding an availability of the better application support capability and/or cost effectiveness of the second cloud computing service provider; and/or
   receiving, at the server device, a third notification from a security device regarding a security breach detected at the first cloud computing service provider.

15. The method of claim 10, wherein the handing-off occurs without a disruption in the execution of the application.

16. The method of claim 10, wherein the handing-off is carried out in real-time such that the current state of the execution of the application is used by the second cloud computing service provider platform to continue the execution of the application after the handing-off is completed.

17. The method of claim 10, wherein responsive to the application being detected to be dormant, the handing-off is carried out using a set of parameters associated with the application.

18. The method of claim 10, wherein the second cloud computing service provider is selected based upon satisfying optimum performance metric conditions required for the execution of the application.

19. The method of claim 10, further comprising receiving bid information for the second computer service provider to execute the application and the determining to hand-off the execution of the application is based on the bid information.

20. A non-transitory tangible computer-readable storage medium having one or more computer-readable instructions thereon to handle a hand-off in a cloud computing environment, which when executed by a processor cause the processor to:
   determine to hand-off execution of an application executing on a platform of a first cloud computing service provider to a second cloud computing service provider;
   determine, at a server device, whether the second cloud computing service provider satisfies a policy associated with the application; and
   hand-off, using the server device, the execution of the application to a platform of the second cloud computing provider based upon the second cloud computing provider being compliant with the policy associated with the application, wherein the hand-off comprises transfer of a current state associated with the execution of the application to the second cloud computing service platform.

* * * * *